(12) United States Patent
Saito

(10) Patent No.: US 10,348,913 B2
(45) Date of Patent: Jul. 9, 2019

(54) IMAGE FORMING APPARATUS

(71) Applicant: CANON KABUSHIKI KAISHA, Tokyo (JP)

(72) Inventor: Kazuhiro Saito, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/494,143

(22) Filed: Apr. 21, 2017

(65) Prior Publication Data
US 2017/0310838 A1 Oct. 26, 2017

(30) Foreign Application Priority Data
Apr. 25, 2016 (JP) ................. 2016-087538

(51) Int. Cl.
H04N 1/00 (2006.01)
G03G 15/00 (2006.01)

(52) U.S. Cl.
CPC ..... *H04N 1/00496* (2013.01); *G03G 15/5016* (2013.01); *H04N 1/00564* (2013.01)

(58) Field of Classification Search
CPC .. G03G 15/50; G03G 15/5016; H04N 1/0035; H04N 1/00352; H04N 1/00384; H04N 1/00405; H04N 1/00411; H04N 1/00493; H04N 1/00496

USPC .......................................................... 399/81
See application file for complete search history.

(56) References Cited

U.S. PATENT DOCUMENTS

2003/0061684 A1* 4/2003 Tanaka ................. F16C 11/103
16/337
2012/0305726 A1* 12/2012 Hashimoto ........... F16M 11/10
248/292.12

FOREIGN PATENT DOCUMENTS

JP 2010-102143 A 5/2010

* cited by examiner

Primary Examiner — Benjamin R Schmitt
(74) Attorney, Agent, or Firm — Canon U.S.A. Inc., IP Division

(57) ABSTRACT

A friction member that abuts against a rotating member being fixed to a display portion and that stops the rotating member being fixed to a display portion by frictional resistance of an abutting surface accommodates the rotating member into a predetermined accommodating position in a reliable manner by changing a frictional force of the friction member.

39 Claims, 15 Drawing Sheets

θ = 0°　　　　θ = 45°　　　　θ = 90°

IMAGE FORMING APPARATUS

BACKGROUND OF THE INVENTION

Field of the Invention

The present disclosure relates to image forming apparatuses, such as a copier and a printer.

Description of the Related Art

Hitherto, a proposal has been made for image forming apparatuses such as, for example, a copier and a laser printer, that adopt an electrophotographic method. In the proposal, an operation unit is tilted (inclined) so that a person with low height and a person on a wheelchair can operate the image forming apparatus.

An operation unit of an image forming apparatus proposed in Japanese Patent Laid-Open No. 2010-102143 provides a free stop hinge at a rotation center of the tilting operation unit. Hitherto, the free stop hinge is, typically, provided with a torque limiter, a torsion spring, or the like.

In conventional operation units that provide a torque limiter or the like at the rotation center, reactive force acts in a direction opposite to the tilting direction, and a phenomenon occurs in which the operation unit is moved back in the direction of the reactive force when the tilting is stopped. Such a phenomenon causes a problem in which when the operation unit is tilted, for example, to stop the operation unit at a certain angle, the operation unit becomes lifted and cannot be set at that certain angle. Because of the above, the user needs to attempt tilting the operation unit once more disadvantageously causing the user to feel irritated.

Accordingly, the present disclosure provides an image forming apparatus that is capable of adjusting an inclination angle of a rotating member by using frictional force, and that prevents the rotating member from being lifted from an accommodating position when the rotating member is accommodated in the accommodating position.

SUMMARY OF THE INVENTION

The present disclosure provides an image forming apparatus including an image forming unit that forms an image, the image forming apparatus including a display portion that displays a state of the image forming unit, an accommodating portion in which the display portion is accommodated, a rotating member being fixed to the display portion and being rotatably supported by a support portion provided in the accommodating portion such that the display portion is configured to pivot in a vertical direction, wherein the display portion is capable of being pivoted with respect to the accommodating portion such that a center of mass of the display portion that has been pivoted from the accommodating portion is vertically above a center of mass of the display portion accommodated in the accommodating portion, and an applying member provided in the accommodating portion so as to come into surface contact with the rotating member, the applying member applying frictional force to the rotating member, the applying member being provided in the accommodating portion such that an area in contact with the rotating member is, in a case in which a predetermined position where the center of mass of the display portion that has been pivoted from the accommodating portion in the vertical direction is above the center of mass of the display portion accommodated in the accommodating portion is positioned further above, larger than an area in contact with the rotating member in a case in which the center of mass of the display portion that has been pivoted from the accommodating portion is positioned at or below the predetermined position. In the image forming apparatus, the display portion in which the center of mass is positioned vertically above the predetermined position is stopped by the frictional force applied by the applying member, and the display portion in which the center of mass is positioned at or below the predetermined position is pivoted by a weight of the display portion and is accommodated in the accommodating portion.

Further features of the present invention will become apparent from the following description of exemplary embodiments with reference to the attached drawings.

BRIEF DESCRIPTION OF THE DRAWINGS

FIGS. 11A and 11B are diagrams in which FIG. 11A is a diagram in which an arm holding plate has been removed, and FIG. 11B illustrates an abutting portion, according to a second exemplary embodiment of the present disclosure.

DESCRIPTION OF THE EMBODIMENTS

First Exemplary Embodiment

The present disclosure can be used in a unit that pivots (a pivoting unit) included in an apparatus main body of an image forming apparatus; however, herein, an example of a case in which the present disclosure is used in a tilting liquid crystal display portion will be given. Hereinafter, an operation unit of a printer serving as an image forming apparatus will be described. Note that the present disclosure is not limited to a printer and may be applied to an image forming apparatus, such as a multifunction apparatus.

Figure 1:
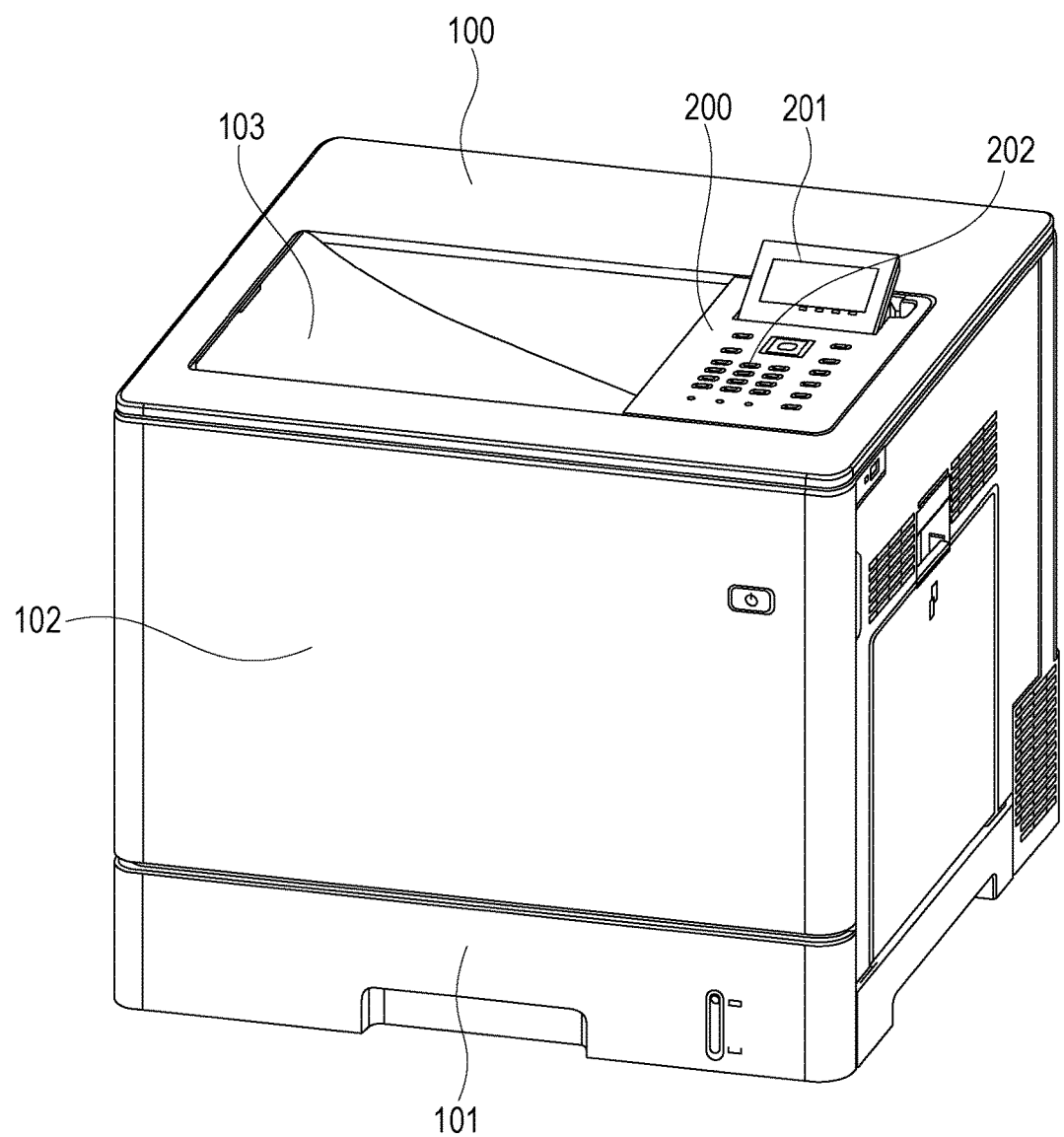
FIG. 1 is a diagram illustrating an entirety of an image forming apparatus according to a first exemplary embodiment of the present disclosure.

FIG. 1 is an outside drawing of a printer 100. The printer 100 includes a feed unit 101 at the bottom, an image forming unit 102 at the middle, and a sheet discharge unit 103 at the top. Since the printer 100 operates in a typical manner, description of the operation will be omitted. An operation unit 200 is disposed on an upper surface of the printer 100. A liquid crystal display portion 201 that displays an operation state (information) of the printer 100 is disposed in the operation unit 200.

Furthermore, various types of keys, such as a keypad 202, for inputting the number of prints are disposed in the operation unit 200. The liquid crystal display portion 201 includes a tilt mechanism that enables the liquid crystal display portion 201 to be viewed easily when it is difficult to view due to a reflection of a lighting unit or when a person with low height or a person on a wheelchair need to view the liquid crystal display portion 201 easily.

Tilt Mechanism

Figure 2:
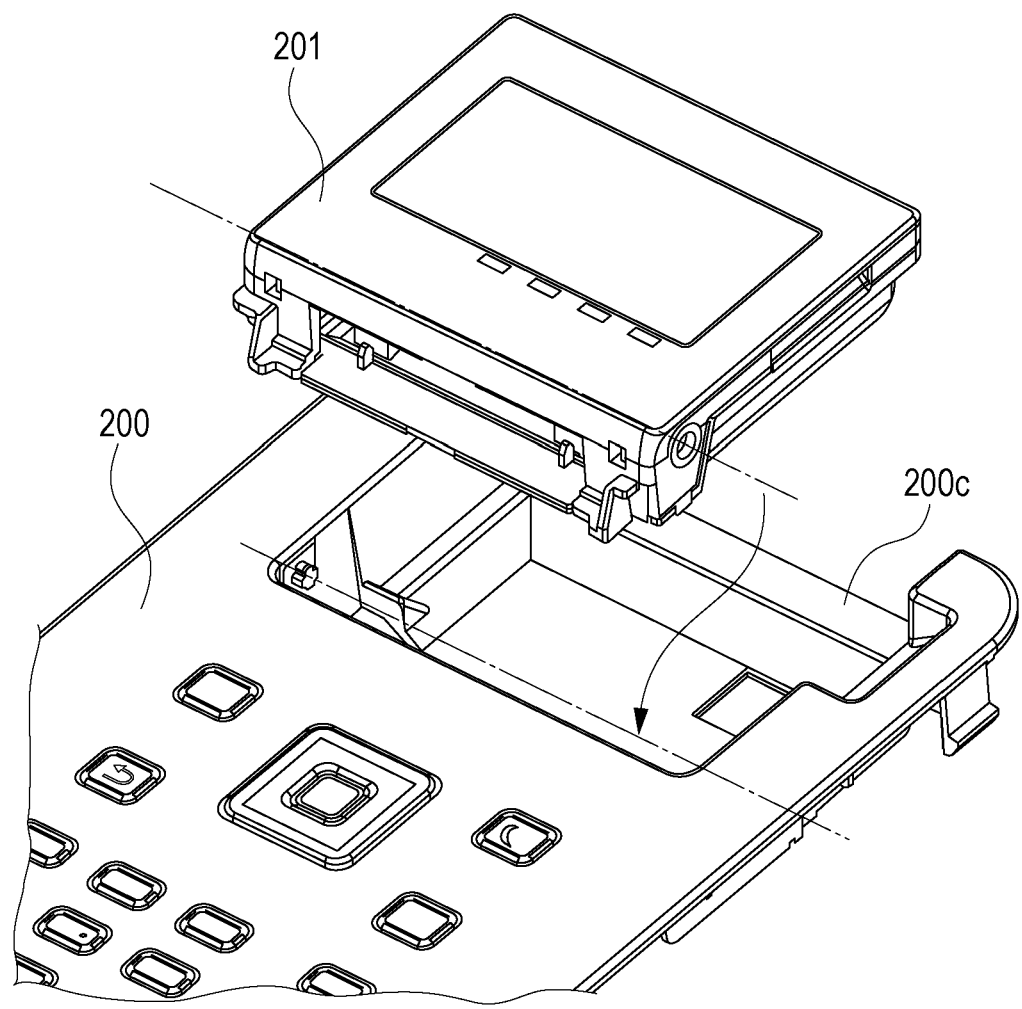
FIG. 2 is a diagram for describing an operation unit and a liquid crystal display portion of the first exemplary embodiment of the present disclosure.
Figure 3A:
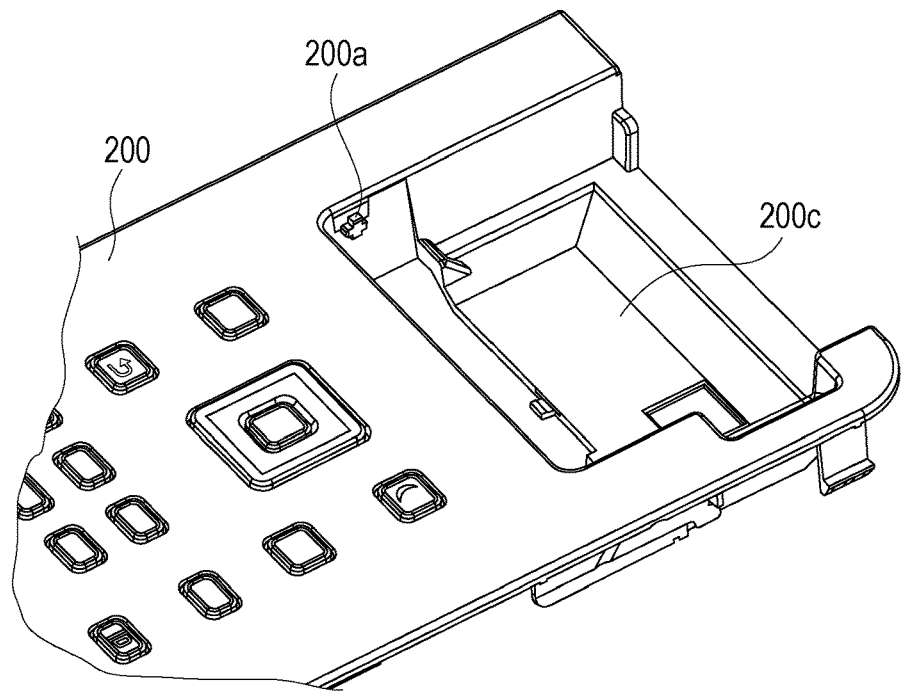
FIGS. 3A and 3B are diagrams for describing a shaft (FIG. 3A) and a hole (FIG. 3B) in a recess portion of the operation unit according to the first exemplary embodiment of the present disclosure.
Figure 3B:
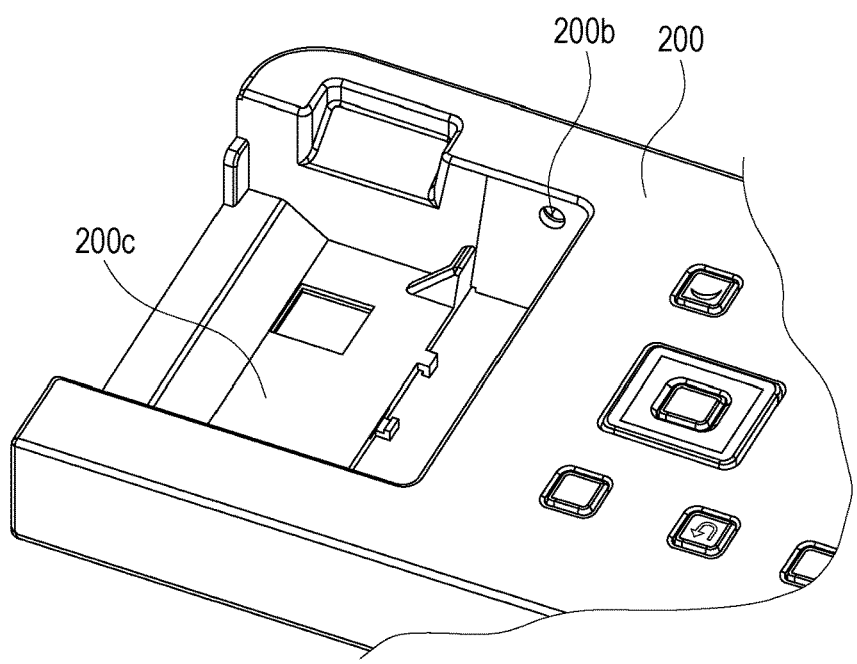
Figure 4A:
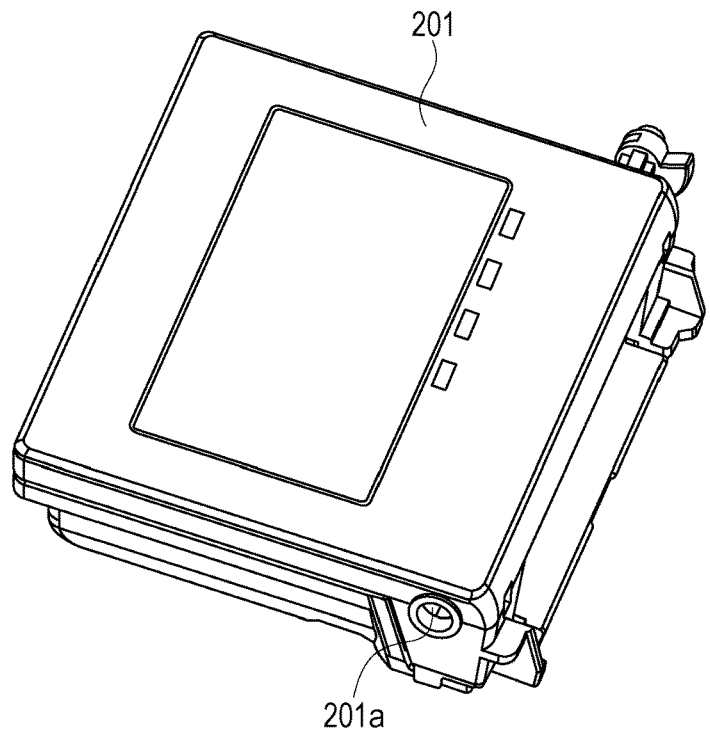
FIGS. 4A and 4B are diagrams for describing a hole (FIG. 4A) and a tilt arm (FIG. 4B) of the liquid crystal display portion according to the first exemplary embodiment of the present disclosure.
Figure 4B:
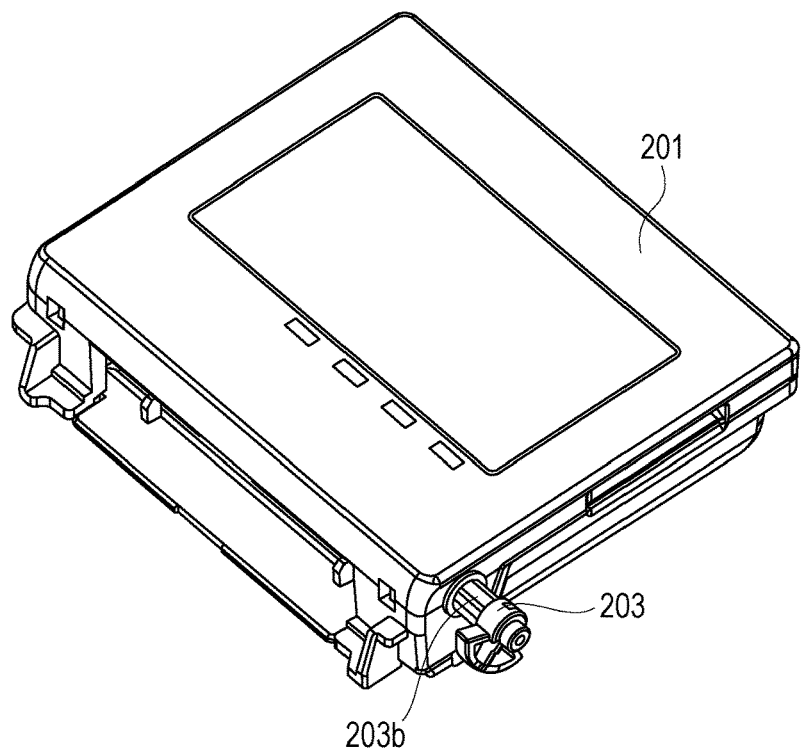
Figure 5A:
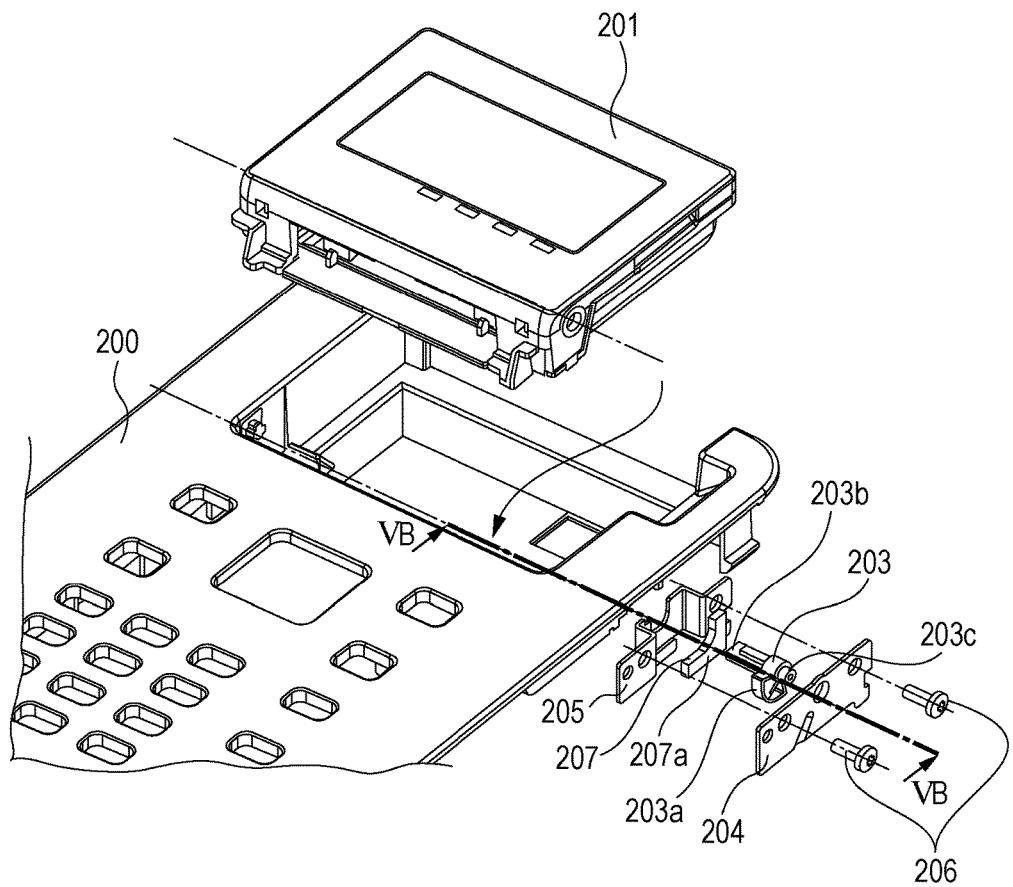
FIGS. 5A and 5B are diagrams for describing a configuration (FIG. 5A) and a cross-section of a pivoting portion (FIG. 5B) of the liquid crystal display portion according to the first exemplary embodiment of the present disclosure.
Figure 5B:
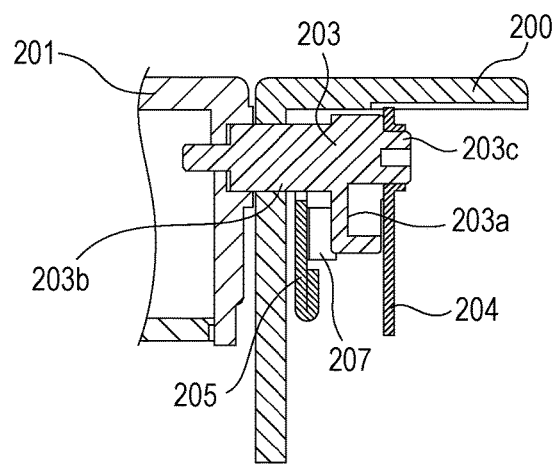

A configuration of the tilting liquid crystal display portion 201 serving as a rotating member will be described next. FIG. 2 is a diagram illustrating a recess portion 200c serving as an accommodating portion that accommodates the liquid crystal display portion 201. The liquid crystal display portion 201 is housed inside the recess portion 200c of the operation unit 200. The liquid crystal display portion 201 pivots about a shaft 200a provided on a lateral side of the recess portion 200c and a hole 200b provided in a coaxial manner with respect to the shaft 200a, which are illustrated in FIGS. 3A and 3B. In the rotation center, a hole 201a provided on a lateral side of the liquid crystal display portion 201 illustrated in FIG. 4A engages with the shaft 200a. On the other side of the liquid crystal display portion 201, a shaft 203b of a tilt arm 203 that pivots in an integral manner with the liquid crystal display portion 201 engages with the hole 200b of the operation unit 200. In other words, the liquid crystal display portion 201 is rotatably supported by the operation unit 200. Furthermore, pivoting of the liquid crystal display portion 201 is restricted by a pivot stopper (not shown) such that the liquid crystal display portion 201 can be pivoted at a pivot angle (a tilt angle) ranging from 0° to 90°. FIGS. 5A and 5B are diagrams illustrating a configuration of the tilt mechanism. The shaft 203b of the tilt arm 203 is supported by the hole 200b, and a shaft 203c at an end portion of the tilt arm 203 is supported by an arm holding plate 204. The tilt arm 203 includes a fan-shaped arm 203a between the shaft 203b and the shaft 203c. The arm holding plate 204 is fixed, together with a sheet holding plate 205, to a lateral side on the outside of the operation unit recess portion 200c with screws 206. An elastically deforming sheet 207 that has a highly frictional surface 207a and that serves as a friction applying member is attached to the sheet holding plate 205. The highly frictional surface 207a of the sheet 207 abuts against a lateral side of the fan-shaped arm 203a of the tilt arm 203, and is elastically deformed in a direction of the pivot axis. The liquid crystal display portion 201 stops due to frictional resistance between the sheet 207 and the portion of the tilt arm 203 abutting against the sheet 207. In other words, the liquid crystal display portion 201 is configured so that the liquid crystal display portion 201 can be self-supported by the frictional resistance between the sheet 207 and the portion of the tilt arm 203 abutting against the sheet 207.

Feature of Present Disclosure

A feature of the present disclosure is that the tilting liquid crystal display portion can be prevented from being accommodated at a misaligned position with respect to a predetermined accommodating position due to reactive force when accommodating the tilting liquid crystal display portion to the predetermined accommodating position.

Details Thereof Will be Described.

Figure 6:
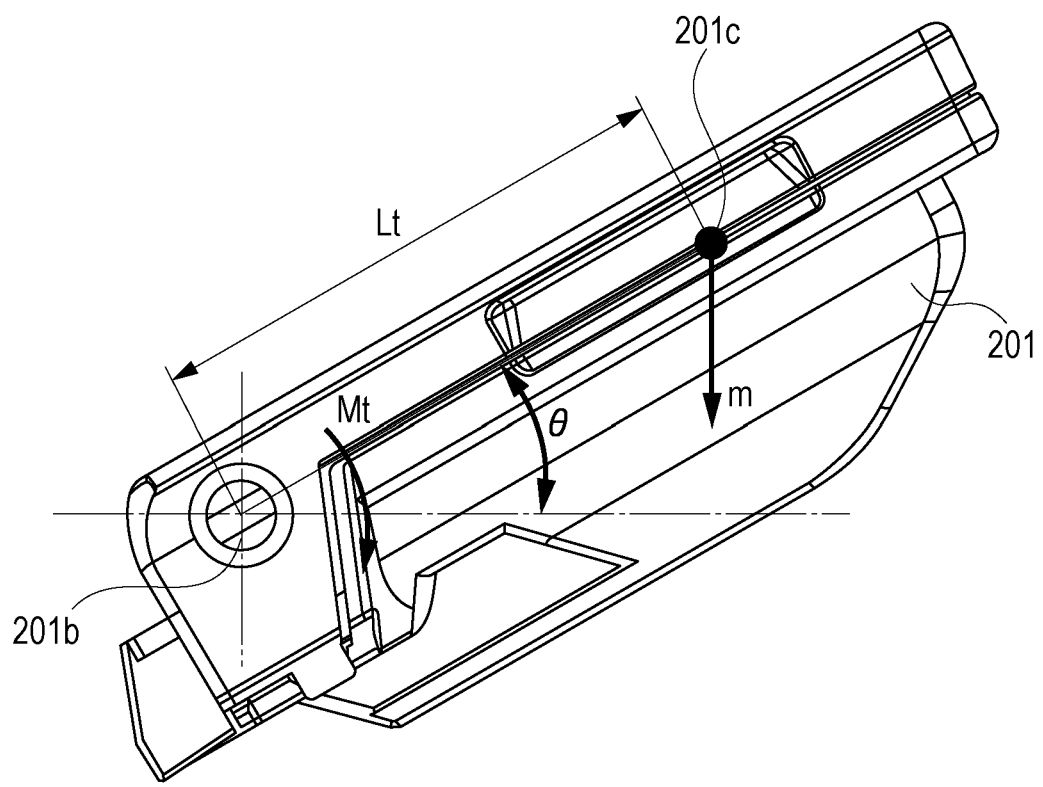
FIG. 6 is a diagram for describing a moment created by an own weight of the liquid crystal display portion according to the first exemplary embodiment of the present disclosure.

Referring first to FIG. 6, a moment pivoting the liquid crystal display portion 201 created by the weight of the liquid crystal display portion 201 itself will be described. The moment (N·mm) pivoting the liquid crystal display portion by its own weight is expressed by the following equation, where m (kg) is the weight of the liquid crystal display portion 201, Lt (mm) is the distance between a rotation center 201b and a center of mass 201c of the liquid crystal display portion 201, and θ (°) is the pivot angle of the liquid crystal display portion 201.

$$Mt = 9.8 \times m \times Lt \times \cos\theta$$

Note that θ is an angle formed between the liquid crystal display portion and a horizontal plane.

Figure 7:
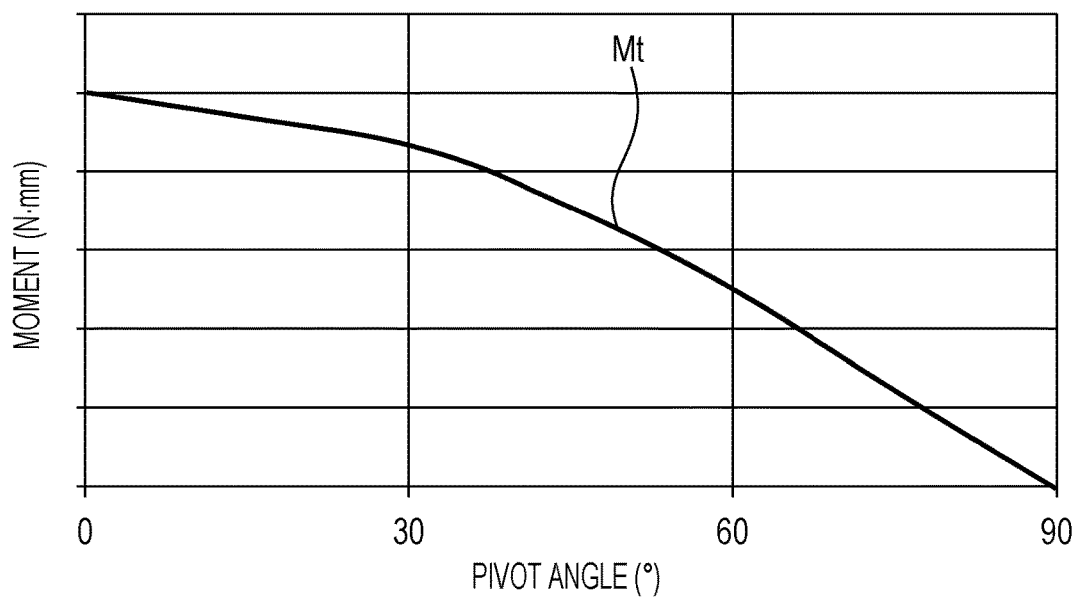
FIG. 7 is a diagram for describing a relationship between a pivot angle of the liquid crystal display portion and a moment created by an own weight of the liquid crystal display portion according to the first exemplary embodiment of the present disclosure.

When the axis of abscissas is the pivot angle of the liquid crystal display portion 201, and the axis of ordinates is the moment, a relationship illustrated in FIG. 7 is established such that when θ=0°, Mt is the largest, and when θ=90°, Mt is the smallest.

In order to stop the liquid crystal display portion 201, a torque generating unit that generates a torque in the pivot shaft that is higher in load than Mt needs to be provided. However, as is the case of the tilting touch panel, in a case in which pressing force is applied to the liquid crystal display portion, taking such moment into account, a torque generating unit generating an accordingly larger torque is needed.

Figure 8A:
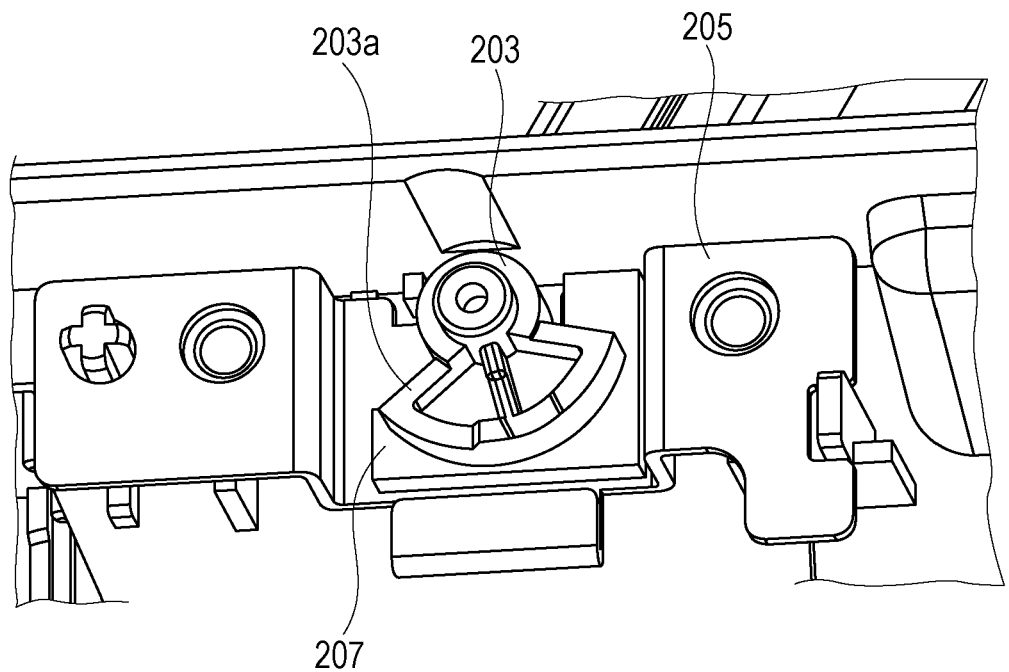
FIGS. 8A and 8B are diagrams for describing an area of an abutting portion (FIG. 8A), and a relationship between the pivot angle of the liquid crystal display portion and the area of the abutting portion (FIG. 8B) according to the first exemplary embodiment of the present disclosure.
Figure 8B:
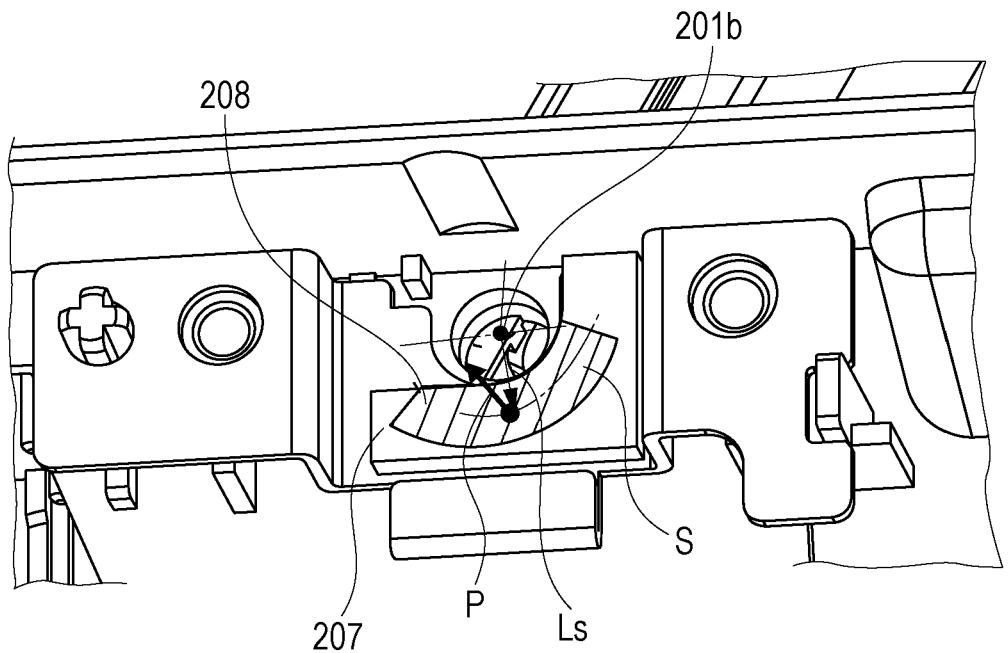

In the present exemplary embodiment, a liquid crystal display portion that is not a touch panel type and that includes a torque generating unit that uses frictional resistance will be described. As described above, the lateral side of the fan-shaped arm 203a of the tilt arm 203 receives reactive force from the sheet 207 upon elastic deformation of the sheet 207. As illustrated in FIGS. 8A and 8B, it is assumed that P (N/mm$^2$) is the pressure of the sheet 207, S (mm$^2$) is an area of a contact surface 208 (the hatched portion) between the sheet 207 and the arm 203a, µ is the friction coefficient of the surface of the sheet 207, and Ls (mm) is the distance from the rotation center 201b of the liquid crystal display portion 201 to a center of the contact surface between the sheet 207 and the arm 203a. When the moment pivoting the liquid crystal display portion 201 by its own weight is excluded, the torque Ts (N·mm) needed to pivot the tilt arm 203 is as follows.

$$Ts=\mu \times P \times S-Ls$$

Figure 9A:
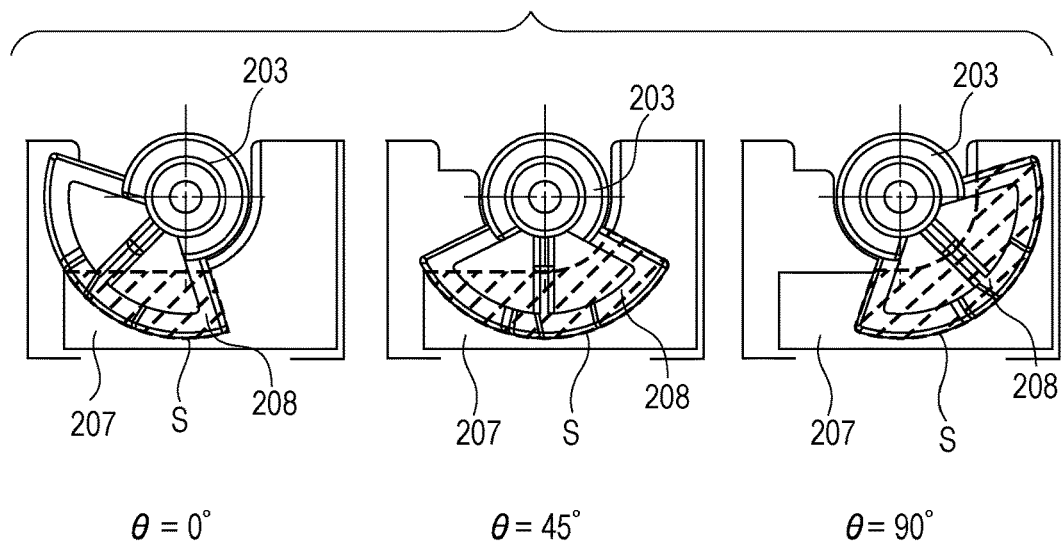
FIGS. 9A and 9B are diagrams for describing a sheet and an abutting portion of a tilt arm (FIG. 9A), and reactive force of the sheet (FIG. 9B) according to the first exemplary embodiment of the present disclosure.
Figure 9B:
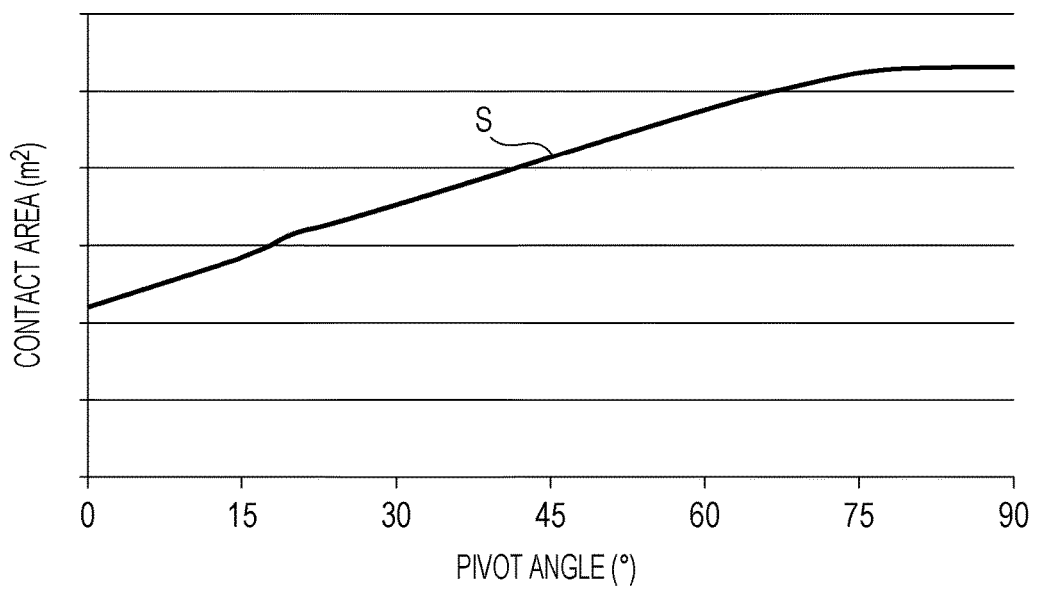

In a case in which a value obtained by subtracting the moment Mt pivoting the liquid crystal display portion 201 by its own weight from Ts described above is positive, then the liquid crystal display portion 201 is self-supported, and in a case in which the value is negative, then the liquid crystal display portion is not self-supported and is pivoted by its own weight. The present exemplary embodiment is configured so that when the pivot angle θ of the liquid crystal display portion 201 is around 0°, the pivot angle of the liquid crystal display portion reliably moves to 0°. Hatched portions in FIG. 9A illustrate the areas S of the contact surfaces 208 between the tilt arm 203 and the sheet 207 when the pivot angles θ are 0°, 45°, and 90°. FIG. 9B is a graph illustrating the relationship between the pivot angle θ and the area S of the contact surface 208. As featured in the graph, the contact areas S around pivot angle θ=0° are small compared with the contact areas S other than around pivot angle θ=0°.

Figure 10:
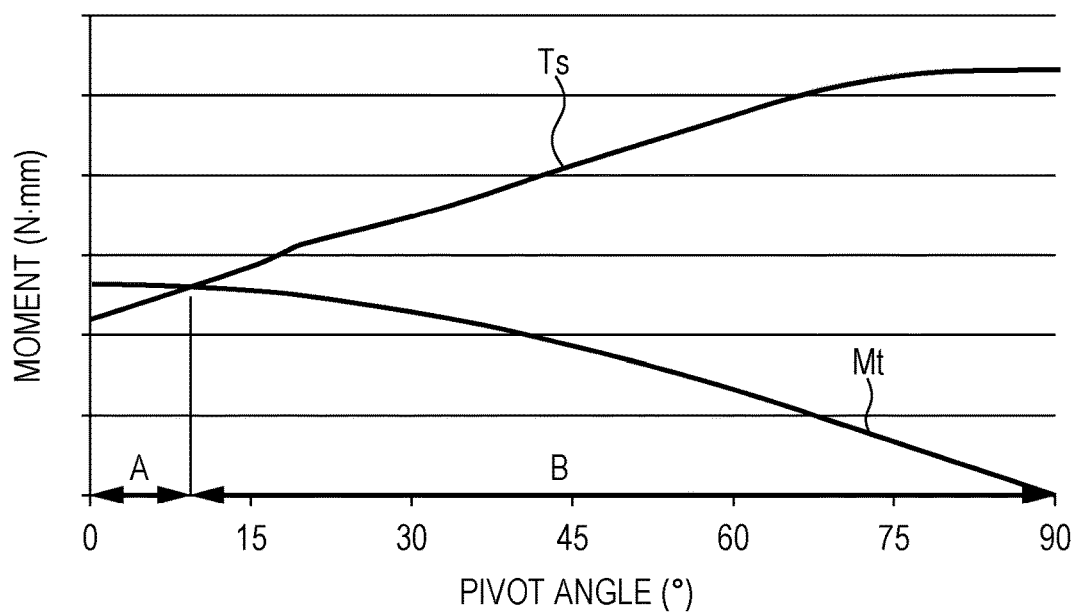
FIG. 10 is a diagram for describing a relationship between the pivot angle of the liquid crystal display portion, and the moment created by the own weight of the liquid crystal display portion and a torque needed to pivot the tilt arm, according to the first exemplary embodiment of the present disclosure.

FIG. 10 is a diagram illustrating the relationship between Mt and Ts. Since the contact area S changes against the pivot angle θ in the above manner, Ts also changes, as illustrated in the diagram. Since the value Ts−Mt is positive when the pivot angle θ is in range B, the liquid crystal display portion 201 is self-supported. Since the value Ts−Mt is negative when the pivot angle θ is in range A, the liquid crystal display portion 201 is not self-supported. Accordingly, in the range around pivot angle θ=0°, the liquid crystal display portion 201 is pivoted by its own weight and stops at 0°. As described above, when the pivot angle θ is in range A, the liquid crystal display portion 201 can be reliably accommodated at 0°. The present exemplary embodiment is configured so that, in a case in which the pivot angle is equivalent to or smaller than a predetermined angle (10° or smaller), the liquid crystal display portion 201 is not self-supported and is accommodated in the recess portion 200c. Furthermore, in the present exemplary embodiment, the torque needed to pivot the liquid crystal display portion 201 in a case in which the pivot angle θ is a first angle θ1 that is smaller than the predetermined angle is smaller than the torque needed to pivot the liquid crystal display portion 201 in a case in which the pivot angle θ is a second angle θ2 that is larger than the predetermined angle.

Furthermore, regarding the effect of the present disclosure, since the frictional force gradually changes when the pivot angle is in range A, when the liquid crystal display portion 201 is pushed downwards, the liquid crystal display portion 201 is slowly pivoted by its own weight in range A and can be accommodated at 0° in a very smooth manner. In other words, the liquid crystal display portion 201 is configured so that the frictional force of the sheet 207 is applied when the pivot angle of the liquid crystal display portion 201 with respect to the recess portion 200c is in at least range A as well. Accordingly, even in the range where the liquid crystal display portion 201 cannot be self-supported, the liquid crystal display portion 201 can be slowly accommodated into the accommodating portion.

Note that in the present exemplary embodiment, although a unit including a liquid crystal display portion is described as the pivoting unit, the same applies to a case in which an operation unit that includes keys and the like is tilted. Furthermore, although the present exemplary embodiment is configured so that a torque Ts (frictional force) needed for pivoting is generated in the entire range (0° to 90°) where pivoting can be performed, not limited to the above, for example, there may be a range where there is no generation of frictional force. However, it is desirable that Ts be positive in the entire range.

Furthermore, the present exemplary embodiment is configured so that the value Ts−Mt is positive in range B; however, not limited to the above, for example, the value does not have to be positive where the pivot angle is around 90°. However, it is desirable that the value Ts−Mt be positive in range B. Furthermore, in a case in which the value Ts−Mt is positive in range B, there may be a range where Ts becomes smaller as the pivot angle becomes larger.

Note that the sheet 207 may be provided on the tilt arm 203, and a contact surface (a plate) that comes into contact with the sheet 207 provided on the tilt arm 203 may be provided in the operation unit 200. In a case in which such a configuration is employed, an opening or a recess portion that is in non-contact with the sheet 207 may be provided in the movement path of the sheet 207 and in the operation unit 200 such that the contact area between the sheet 207 and the contact surface provided in the operation unit 200 in a case in which the pivot angle is larger than the predetermined angle (larger than 10°) is larger than the contact area between the sheet 207 and the contact surface provided in the operation unit 200 in which the pivot angle is equivalent to or smaller than the predetermined angle (10° or smaller).

Second Exemplary Embodiment

Figure 11A:
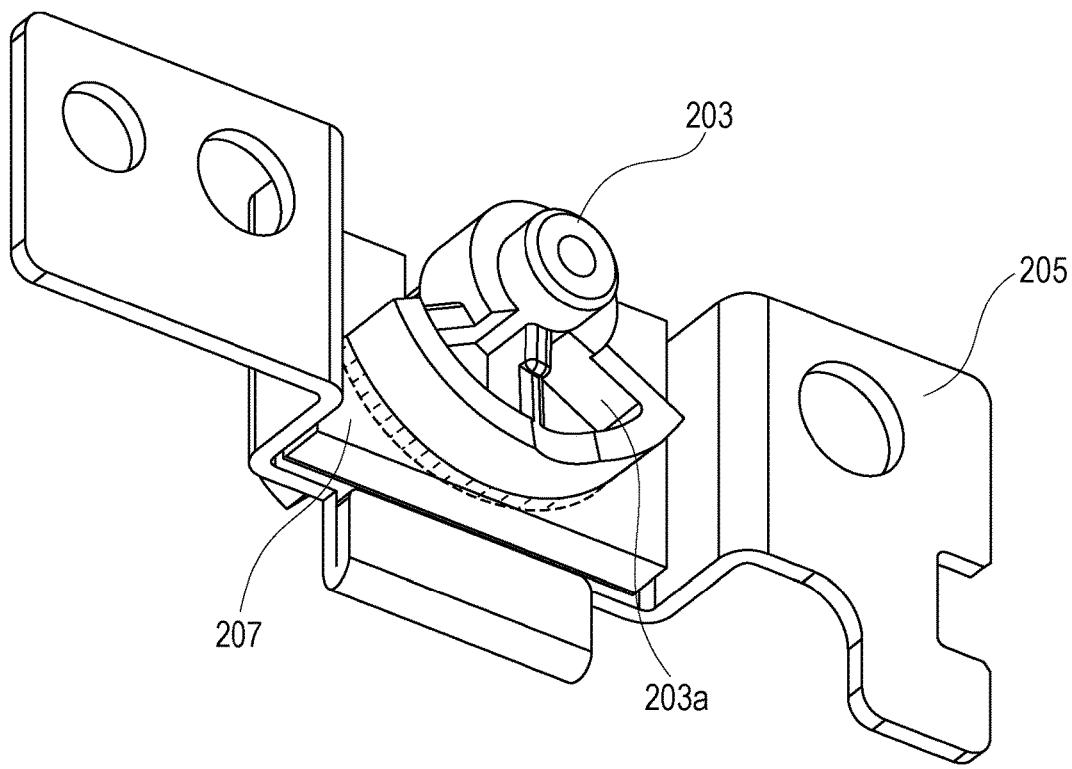
Figure 11B:
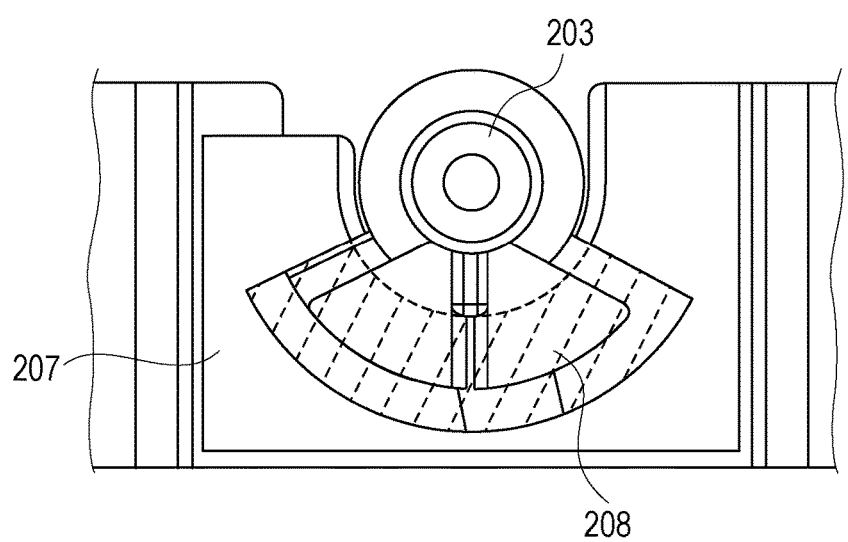
Figure 12A:
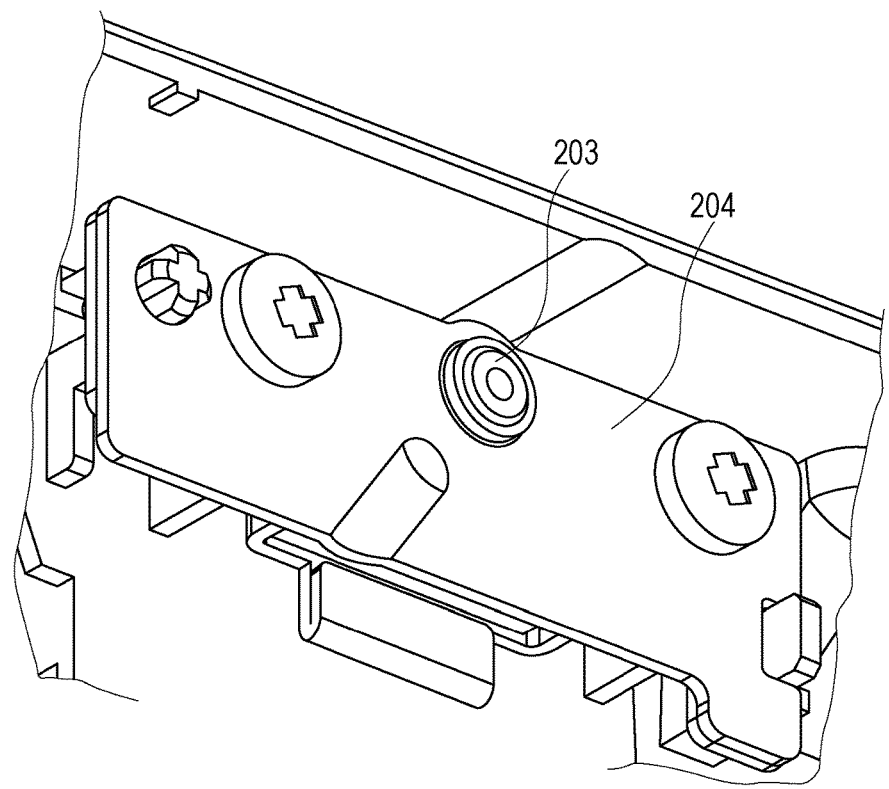
FIGS. 12A and 12B are diagrams for describing the arm holding plate (FIG. 12A), and the abutting portion between a tilt arm and the arm holding plate (FIG. 12B), according to the second exemplary embodiment of the present disclosure.
Figure 12B:
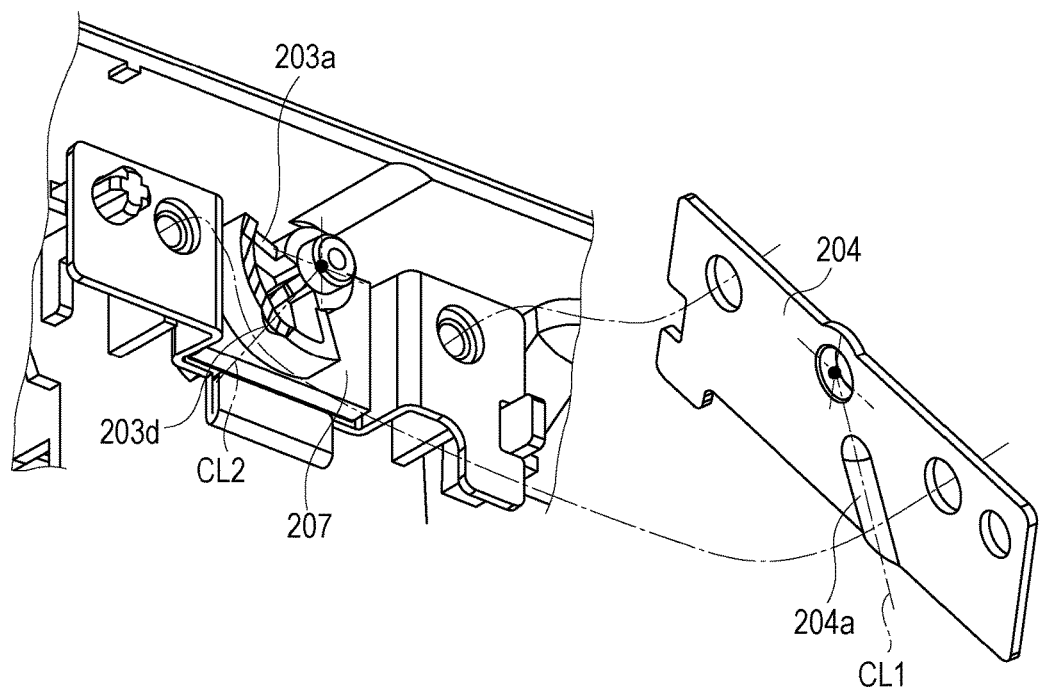

A second exemplary embodiment is different from the first exemplary embodiment in that while the contact area S between the tilt arm 203 and the sheet 207 is uniform, the amount of elastic deformation of the sheet 207 changes with the pivot angle θ of the liquid crystal display portion 201. A configuration of the torque generating unit is the same as that of the first exemplary embodiment. FIGS. 11A and 11B is a diagram illustrating a state in which the arm holding plate 204 has been removed. The sheet 207 is elastically deformed in the hatched area with the fan-shaped arm 203a of the tilt arm 203. A mechanism for changing the amount of elastic deformation (an inroad amount) of the sheet 207 will be described next. The present exemplary embodiment is configured such that the amount of elastic deformation of the sheet 207 in the thickness direction is capable of being changed in accordance with the pivot angle θ of the liquid crystal display portion 201. FIG. 12A depicts a torque generating unit. As illustrated in FIG. 12B, the arm holding plate 204 includes a protrusion 204a on the surface that opposes the fan-shaped arm 203a of the tilt arm 203.

Figure 13A:
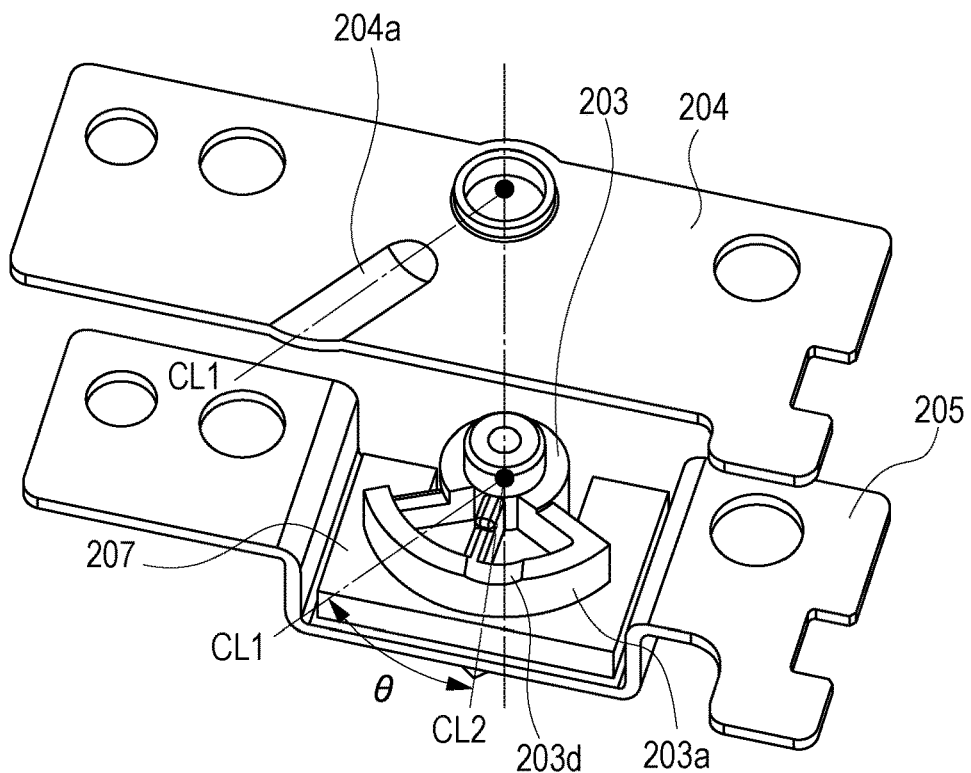
FIGS. 13A and 13B are diagrams for describing a positional relationship between the tilt arm and the arm holding plate in a case in which a pivot angle of a liquid crystal display portion according to the second exemplary embodiment of the present disclosure is 45° (FIG. 13A), and a deformation amount of a sheet (FIG. 13B).
Figure 13B:
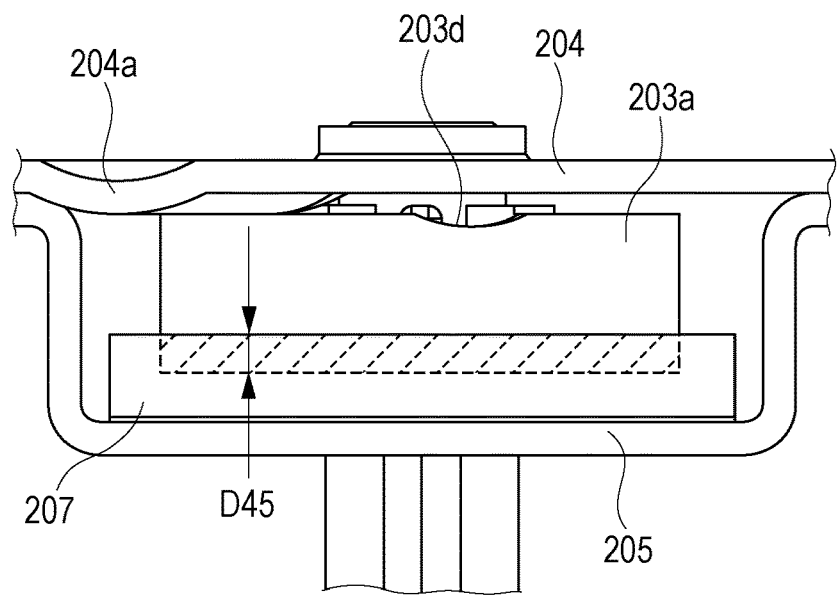
Figure 14A:
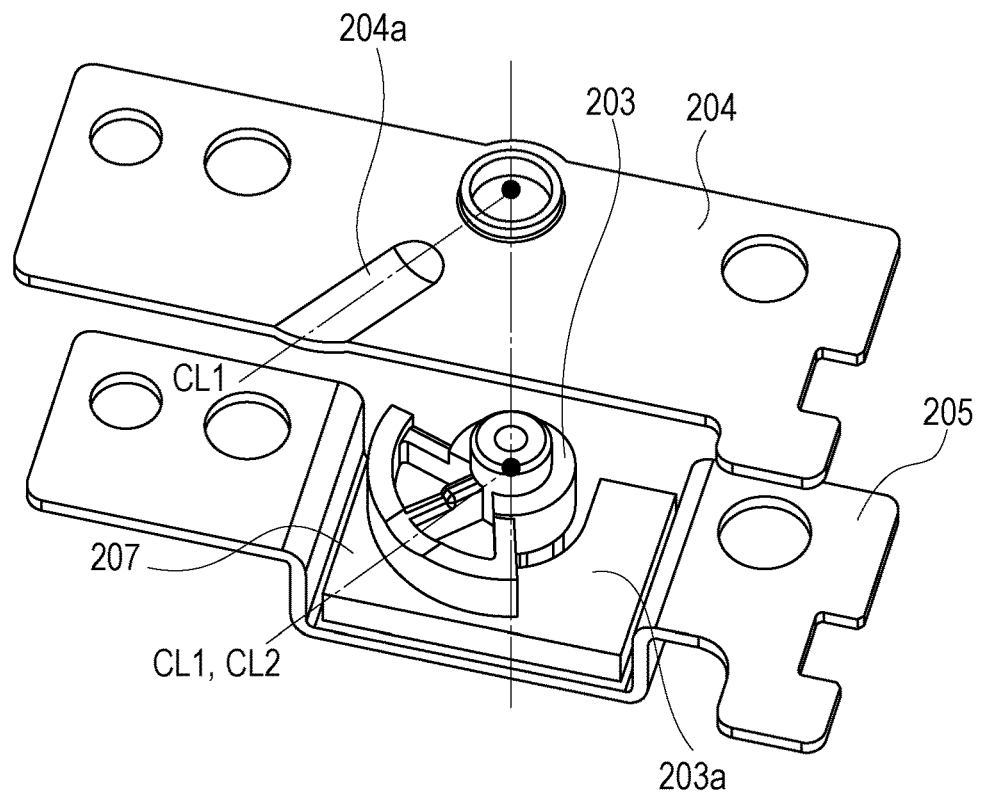
FIGS. 14A and 14B are diagrams for describing a positional relationship between the tilt arm and the arm holding plate in a case in which the pivot angle of the liquid crystal display portion according to the second exemplary embodiment of the present disclosure is 0° (FIG. 14A), and a deformation amount of a sheet (FIG. 14B).
Figure 14B:
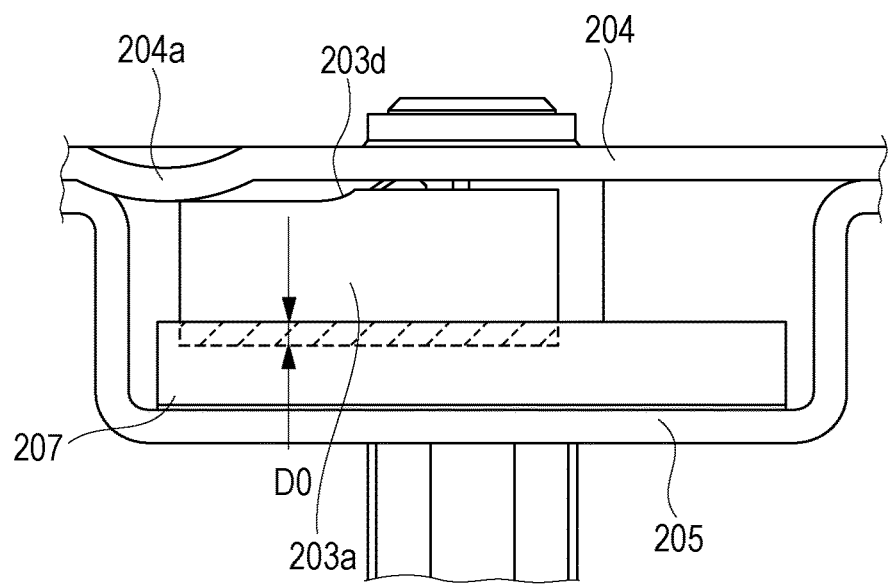
Figure 15:
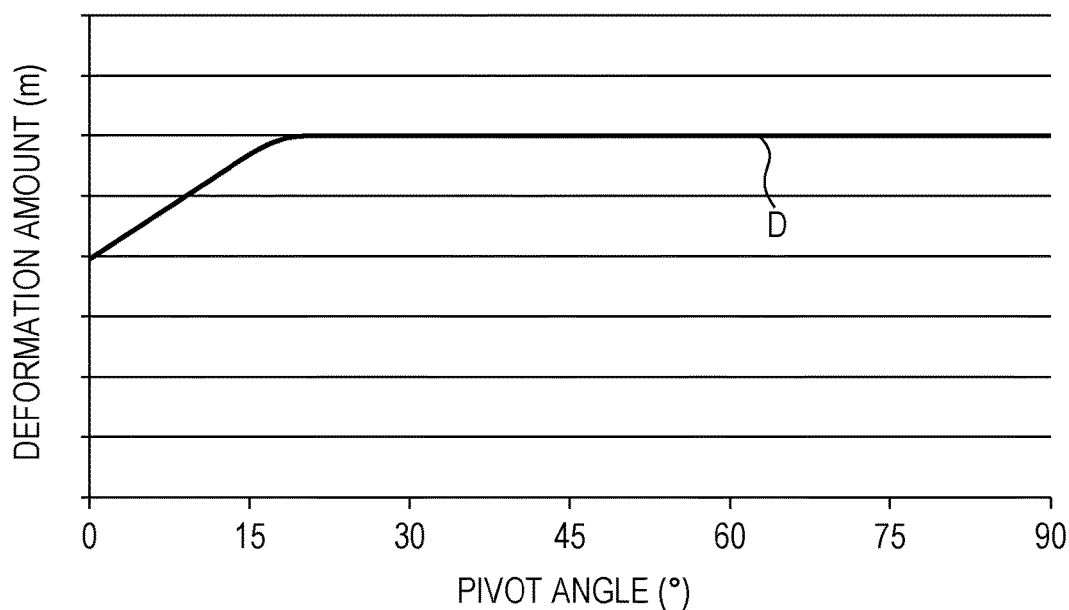
FIG. 15 is a diagram for describing the pivot angle and the deformation amount of the sheet of the liquid crystal display portion according to the second exemplary embodiment of the present disclosure.

Meanwhile, the fan-shaped arm 203a of the tilt arm 203 includes a recess portion 203d on the surface opposing the arm holding plate 204. A center line CL1 of the protrusion 204a and a center line CL2 of the recess portion 203d are lines that both pass through the rotation center of the liquid crystal display portion 201, and the angle formed by the lines is set so as to coincide with the pivot angle θ of the liquid crystal display portion 201. Upon pivoting of the liquid crystal display portion 201, the hatched portion of the fan-shaped arm 203a of the tilt arm 203 and the protrusion 204a of the arm holding plate 204 abut against each other. As an example, states in which the pivot angle θ of the liquid crystal display portion 201 is 45° and 0° will be described. FIG. 13A illustrates phases of the protrusion 204a of the arm holding plate 204 and the recess portion 203d of the fan-shaped arm 203a when the pivot angle θ of the liquid crystal display portion 201 is 45°. The angle formed between the center line CL1 of the protrusion 204a and the center line CL2 of the recess portion 203d is the same as the pivot angle of the liquid crystal display portion 201, that is, θ=45°. FIG. 13B depicts the deformation amount of the sheet 207 in the above state. The protrusion 204a of the arm holding plate 204 abuts against the surface of the fan-shaped arm 203a positioned higher than the recess portion 203d of the fan-shaped arm 203a, and the sheet 207 is elastically deformed D45 (m). FIG. 14A illustrates phases of the protrusion 204a of the arm holding plate 204 and the recess portion 203d of the fan-shaped arm 203a when the pivot angle θ of the liquid crystal display portion 201 is 0°. The center line CL1 of the protrusion 204a and the center line CL2 of the recess portion 203d coincide each other. FIG. 14B depicts the deformation amount of the sheet 207 in the above state, and the sheet 207 is elastically deformed D0 (m). In cases in which the pivot angles θ of the liquid crystal display portion 201 are 45° and 0°, the deformation amount of the sheet 207 is smaller at 0°, and the difference (D45−D0) between the deformation amounts of the sheet 207 coincides with the recessed amount of the recess portion 203d of the fan-shaped arm 203a. FIG. 15 illustrates a graph between the pivot angle θ of the liquid crystal display portion 201 and the amount of elastic deformation D of the sheet.

As described above, when the moment pivoting the liquid crystal display portion 201 by its own weight is excluded, the torque Ts (N·mm) needed to pivot the tilt arm 203 is as follows.

$$Ts = \mu \times P \times S \times Ls$$

Figure 16:
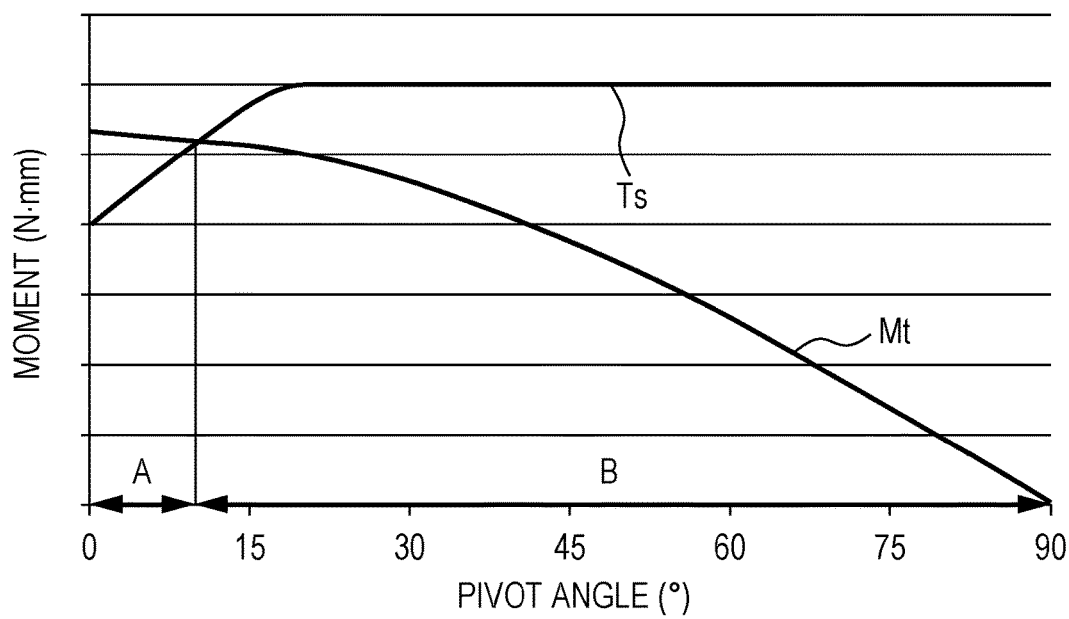
FIG. 16 is a diagram for describing a relationship between the pivot angle of the liquid crystal display portion, and a moment created by an own weight of the liquid crystal display portion and a torque needed to pivot a tilt arm, according to the second exemplary embodiment of the present disclosure.

The sheet 207 uses a member that generates a pressure P (N/mm$^2$) that is proportional to the elastically deformed amount. In the present exemplary embodiment, the contact area S between the tilt arm 203 and the sheet 207 is uniform throughout all of the pivot angles θ of the liquid crystal display portion 201; accordingly, Ts changes in a manner similar to the change in the amount of elastic deformation D against the pivot angle θ. FIG. 16 illustrates a relationship between Mt and Ts, and similar to the first exemplary embodiment, when the pivot angle θ is in range A, the liquid crystal display portion 201 can be reliably accommodated at 0°. Note that in the present exemplary embodiment, while the contact area S is uniform throughout all of the pivot angles θ of the liquid crystal display portion 201, as in the first exemplary embodiment, even when the contact area S changes in the present exemplary embodiment, a similar effect can be obtained.

Furthermore, a similar effect can be obtained with a configuration in which the friction coefficient μ of the surface of the sheet 207 changes with the change in the pivot angle θ of the liquid crystal display portion 201.

The present disclosure is, in an image forming apparatus capable of adjusting an inclination angle of a rotating member by using frictional force, capable of preventing the rotating member from being lifted from an accommodating position with reactive force generated in the rotating member when accommodating the rotating member in the accommodating position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087538 filed Apr. 25, 2016, which is hereby incorporated by reference herein in its entirety.

What is claimed is:

1. An image forming apparatus including an image forming unit that forms an image, the image forming apparatus comprising:
   a display portion configured to display a state of the image forming unit;
   an operation unit including an accommodating portion configured to accommodate the display portion;
   a pivoting member provided in the display portion and being pivotably supported by a support portion provided in the accommodating portion such that the display portion is configured to pivot, wherein the display portion is capable of being pivoted with respect to the accommodating portion such that a center of mass of the display portion that has been pivoted from the accommodating portion is vertically above a center of mass of the display portion accommodated in the accommodating portion; and
   an applying member provided in the operation unit so as to come into surface contact with the pivoting member, wherein the applying member is configured to apply frictional force to the pivoting member,
   wherein the applying member is provided in the operation unit so that an area in contact with the pivoting member, in a case where a center of mass of the display portion is positioned vertically above a predetermined position, is larger than the area in contact with the pivoting member, in a case where the center of mass of the display portion is positioned at or below the predetermined position in a vertical direction,
   wherein the predetermined position is a position that the center of mass of the display portion is vertically above the position of the center of mass of the display portion in a case where the display portion is accommodated in the accommodating portion,
   wherein the display portion in which the center of mass is positioned vertically above the predetermined position is stopped by the frictional force applied by the applying member, and the display portion in which the center of mass is positioned at or below the predetermined position is pivoted by a weight of the display portion and is accommodated in the accommodating portion.

2. The image forming apparatus according to claim 1, wherein in the display portion in which the center of mass is positioned vertically above the predetermined position, a moment about a pivotal axis acting on the display portion formed by the weight of the display portion is smaller than a counter moment that counters the moment and that acts on the display portion through the frictional force applied to the pivoting member with the applying member.

3. The image forming apparatus according to claim 1, wherein in the display portion in which the center of mass is positioned at or below the predetermined position, a moment about a pivotal axis acting on the display portion formed by the weight of the display portion is larger than a counter moment that counters the moment and that acts on the display portion through the frictional force applied to the pivoting member with the applying member.

4. The image forming apparatus according to claim 1, wherein the predetermined position is a position that is the center of mass of the display portion positioned vertically above a pivotal axis of the display portion.

5. The image forming apparatus according to claim 1, wherein a display surface of the display portion accommodated in the accommodating portion is parallel to a horizontal direction.

6. The image forming apparatus according to claim 1, wherein a contact surface between the pivoting member and the applying member is a surface that is perpendicular to a pivotal axis.

7. The image forming apparatus according to claim 1, wherein when viewing the display portion in a direction in which a pivotal axis extends, a center of mass of the display portion that has pivoted from the accommodating portion is positioned above a horizontal line passing through the pivotal axis.

8. The image forming apparatus according to claim 1, wherein the display portion includes a touch panel, and frictional force that counters a moment about a pivotal axis, the moment being created by the touch panel being pressed and by a weight of the display portion and acting on the display portion, and that stops the display portion when applied to the pivoting member.

9. The image forming apparatus according to claim 1, wherein in a state in which the display portion is accommodated in the accommodating portion, the applying member is in contact with the pivoting member.

10. The image forming apparatus according to claim 1, wherein the display surface of the display portion is parallel to the upper surface of the image forming apparatus in a state where the display portion is accommodated in the accommodating portion.

11. An image forming apparatus including an image forming unit that forms an image, the image forming apparatus comprising:
an operation unit including an accommodating portion;
a display portion configured to display a state of the image forming unit and that is accommodated in the accommodating portion, and being pivotably supported by a support portion provided in the accommodating portion such that the display portion is configured to pivot, wherein the display portion is capable of being pivoted with respect to the accommodating portion such that a center of mass of the display portion that has been pivoted from the accommodating portion is vertically above a center of mass of the display portion accommodated in the accommodating portion; and
an applying member provided in the operation unit so as to come into surface contact with the display portion, wherein the applying member is configured to apply frictional force to the display portion,
wherein the applying member is provided in the operation unit so that an area in contact with the display portion, in a case where a center of mass of the display portion is positioned vertically above a predetermined position, is larger than the area in contact with the display portion, in a case where the center of mass of the display portion is positioned at or below the predetermined position in a vertical direction,
wherein the predetermined position is a position that the center of mass of the display portion is vertically above the position of the center of mass of the display portion in a case where the display portion is accommodated in the accommodating portion,
wherein the display portion in which the center of mass is positioned vertically above the predetermined position is stopped by the frictional force applied by the applying member, and the display portion in which the center of mass is positioned at or below the predetermined position is pivoted by a weight of the display portion and is accommodated in the accommodating portion.

12. The image forming apparatus according to claim 11, wherein in the display portion in which the center of mass is positioned vertically above the predetermined position, a moment about a pivotal axis acting on the display portion formed by the weight of the display portion is smaller than a moment that counters the moment and that acts on the display portion through the frictional force applied to the display portion with the applying member.

13. The image forming apparatus according to claim 11, wherein in the display portion in which the center of mass is positioned at or below the predetermined position, a moment about a pivotal axis acting on the display portion formed by the weight of the display portion is larger than a moment that counters the moment and that acts on the display portion through the frictional force applied to the display portion with the applying member.

14. The image forming apparatus according to claim 11, wherein the predetermined position is a position that the center of mass of the display portion is vertically above a pivotal axis of the display portion.

15. The image forming apparatus according to claim 11, wherein a display surface of the display portion accommodated in the accommodating portion is parallel to a horizontal direction.

16. The image forming apparatus according to claim 11, wherein a contact surface between the display portion and the applying member is a surface that is perpendicular to a pivotal axis.

17. The image forming apparatus according to claim 11, wherein when viewing the display portion in a direction in which a pivotal axis extends, a center of mass of the display portion that has pivoted from the accommodating portion is positioned above a horizontal line passing through the pivotal axis.

18. The image forming apparatus according to claim 11, wherein the display portion includes a touch panel, and frictional force that counters the moment about a pivotal axis, the moment being created by the touch panel being pressed and by the weight of the display portion and acting on the display portion, and that stops the display portion is applied to the display portion.

19. The image forming apparatus according to claim 11, wherein in a state in which the display portion is accommodated in the accommodating portion, the applying member is in contact with the pivoting member.

20. The image forming apparatus according to claim 11, wherein the display surface of the display portion is parallel to the upper surface of the image forming apparatus in a state where the display portion is accommodated in the accommodating portion.

21. An image forming apparatus including an image forming unit that forms an image, the image forming apparatus comprising:
a display portion configured to display a state of the image forming unit;
an operation unit including an accommodating portion configured to accommodate the display portion;
a pivoting member provided in the display portion and being pivotably supported by a support portion provided in the accommodating portion such that the display portion is configured to pivot, wherein the display portion is capable of being pivoted with respect to the accommodating portion such that a center of mass of the display portion that has been pivoted from the accommodating portion is vertically above a center of mass of the display portion accommodated in the accommodating portion; and
an elastic member provided in the operation unit so as to come into contact with the pivoting member, wherein the elastic member is configured to be elastically deformed in a direction of a pivotal axis of the pivoting member by being interposed between the pivoting member and the operation unit,
wherein the elastic member is elastically deformed so that frictional force applied to the pivoting member, in a case where a center of mass of the display portion is positioned vertically above a predetermined position, is larger than frictional force applied to the pivoting member, in a case where the center of mass of the display portion is positioned at or below the predetermined position in a vertical direction,
wherein the predetermined position is a position that the center of mass of the display portion is vertically above the position of the center of mass of the display portion in a case where the display portion is accommodated in the accommodating portion,
wherein the display portion in which the center of mass is positioned vertically above the predetermined position is stopped by the frictional force applied by the elastic member, and the display portion in which the center of mass is positioned at or below the predetermined position is pivoted by a weight of the display portion and is accommodated in the accommodating portion.

22. The image forming apparatus according to claim 21, wherein an amount of elastic deformation of the elastic member,
in a case where a center of mass of the display portion is positioned vertically above the predetermined position, is larger than the amount of elastic deformation of the elastic member, in a case where the center of mass of the display portion is positioned at or below the predetermined position in a vertical direction.

23. The image forming apparatus according to claim 21, wherein in the display portion in which the center of mass is positioned vertically above the predetermined position, a moment about the pivotal axis acting on the display portion formed by the weight of the display portion is smaller than a moment that counters the moment and that acts on the display portion through the frictional force applied to the pivoting member with the elastic member.

24. The image forming apparatus according to claim 21, wherein in the display portion in which the center of mass is positioned at or below the predetermined position, a moment about the pivotal axis acting on the display portion formed by the weight of the display portion is larger than a moment that counters the moment and that acts on the display portion through the frictional force applied to the pivoting member with the elastic member.

25. The image forming apparatus according to claim 21, wherein in a state in which the display portion is accommodated in the accommodating portion, the elastic member is in contact with the pivoting member.

26. The image forming apparatus according to claim 21, further comprising:
a holding portion configured to pivotably hold the pivoting member with respect to the accommodating portion;
a protrusion provided on either one of the holding portion or the pivoting member, configured to protrude in the pivotal axis direction of the pivoting member;
a recess portion provided on the other one of said either one of the holding portion or the pivoting member, configured to recess in the protruding direction of the protrusion;
wherein the relative position between the protrusion and the recess portion varies in accordance with the pivot of the pivoting member, and
wherein, when the positions of the protrusion and the recess portion are the same, the amount of elastic deformation in the pivotal axis direction of the elastic member is smaller than the amount of elastic deformation in the pivotal axis direction of the elastic member when the positions of the protrusion and the recess portion are different.

27. The image forming apparatus according to claim 26, wherein the protrusion extends in a radial direction of the pivotal axis of the pivoting member,
wherein the recess portion extends in a radial direction of the pivotal axis of the pivoting member,
wherein the display portion is positioned at the accommodating portion when an angle formed between a center line of the protrusion passing through the pivotal axis of the pivoting member and a center line of the recess portion passing through the pivotal axis of the pivoting member is 0°,
wherein the display portion is positioned at the predetermined position in a case where the angle formed between the center line of the protrusion passing through the pivotal axis of the pivoting member and the center lien of the recess portion passing through the pivotal axis of the pivoting member of 45°.

28. The image forming apparatus according to claim 21, wherein the display surface of the display portion is parallel to the upper surface of the image forming apparatus in a state where the display portion is accommodated in the accommodating portion.

29. An image forming apparatus including an image forming unit that forms an image, the image forming apparatus comprising:
an operation unit including an accommodating portion;
a display portion configured to display a state of the image forming unit and that is accommodated in the accommodating portion, and being pivotably supported by a support portion provided in the accommodating portion, wherein the display portion is capable of being pivoted with respect to the accommodating portion such that a center of mass of the display portion that has been pivoted from the accommodating portion is vertically above a center of mass of the display portion accommodated in the accommodating portion; and an elastic member provided in the accommodating portion so as to come into contact with the display portion, wherein the elastic member is configured to be elastically deformed in a direction of a pivotal axis of the display portion by being interposed between the display portion and the operation unit, wherein the elastic member is elastically deformed so that frictional force applied to the display portion, in a case where a center of mass of the display portion is positioned vertically above a predetermined position, is larger than the frictional force applied to the display portion, in a case where the center of mass of the display portion is positioned at or below the predetermined position in a vertical direction, wherein the predetermined position is a position that is the position of the center of mass of the display portion is vertically above the position of the center of mass of the display portion in a case the display portion is accommodated in the accommodating portion, wherein the display portion in which the center of mass is positioned vertically above the predetermined position is stopped by the frictional force applied by the elastic member, and the display portion in which the center of mass is positioned at or below the predetermined position is pivoted by a weight of the display portion and is accommodated in the accommodating portion.

30. The image forming apparatus according to claim 29, wherein an amount of elastic deformation of the elastic member, in a case where a center of mass of the display portion is positioned vertically above a predetermined position, is larger than the amount of elastic deformation of the elastic member, in a case where a position of the center of mass of the display portion is positioned at or below the predetermined position in a vertical direction.

31. The image forming apparatus according to claim 29, wherein in the display portion in which the center of mass is positioned vertically above the predetermined position, a moment about the pivotal axis acting on the display portion formed by the weight of the display portion is smaller than a moment that counters the moment and that acts on the display portion through the frictional force applied to the pivoting member with the elastic member.

32. The image forming apparatus according to claim 29, wherein in the display portion in which the center of mass is positioned at or below the predetermined position, a moment about the pivotal axis acting on the display portion formed by the weight of the display portion is larger than a moment that counters the moment and that acts on the display portion through the frictional force applied to the pivoting member with the elastic member.

33. The image forming apparatus according to claim 29, wherein in a state in which the display portion is accommodated in the accommodating portion, the elastic member is in contact with the display portion.

34. The image forming apparatus according to claim 29, further comprising:

a holding portion configured to pivotably hold the display portion with respect to the accommodating portion;

a protrusion provided on either one of the holding portion or the display portion, configured to protrude in the pivotal axis direction of the display portion;

a recess portion provided on the other one of said either one of the holding portion or the display portion, configured to recess in the protruding direction of the protrusion;

wherein a relative position between the protrusion and the recess portion varies in accordance with the pivot of the display portion, and wherein, when the positions of the protrusion and the recess portion are the same, the amount of elastic deformation in the pivotal axis direction of the elastic member is smaller than the amount of elastic deformation in the pivotal axis direction of the elastic member when the positions of the protrusion and the recess portion are different.

35. The image forming apparatus according to claim 29, wherein the display surface of the display portion is parallel to the upper surface of the image forming apparatus in a state where the display portion is accommodated in the accommodating portion.

36. An image forming apparatus including an image forming unit that forms an image, the image forming apparatus comprising:

a display portion configured to display a state of the image forming unit;

an operation unit including an accommodating portion configured to accommodate the display portion;

a pivoting member provided in the display portion and being pivotably supported by a support portion provided in the accommodating portion such that the display portion is configured to pivot in a vertical direction, wherein the display portion is capable of being pivoted with respect to the accommodating portion such that a center of mass of the display portion that has been pivoted from the accommodating portion is vertically above a center of mass of the display portion accommodated in the accommodating portion; and an applied member provided in the pivoting member so as to come into surface contact with the operation unit, wherein the applied member is configured to receive frictional force from the operation unit, wherein the applied member is provided to the pivoting member so that an area in contact with the operation unit, in a case where a center of mass of the display portion is positioned vertically above a predetermined position, is larger than the area in contact with the operation unit, in a case where the center of mass of the display portion is positioned at or below the predetermined position in a vertical direction, wherein the predetermined position is a position that the center of mass of the display portion is vertically above the position of the center of mass of the display portion in a case where the display portion is accommodated in the accommodating portion, wherein the display portion in which the center of mass is positioned vertically above the predetermined position is stopped by the frictional force applied from the accommodating portion to the applied member, and the display portion in which the center of mass is positioned at or below the predetermined position is pivoted by a weight of the display portion and is accommodated in the accommodating portion.

37. The image forming apparatus according to claim 36, wherein the display surface of the display portion is parallel to the upper surface of the image forming apparatus in a state where the display portion is accommodated in the accommodating portion.

38. An image forming apparatus including an image forming unit that forms an image, the image forming apparatus comprising:
- an accommodating portion including an operation unit;
- a display portion configured to display a state of the image forming unit and that is accommodated in the accommodating portion, and being pivotably supported by a support portion provided in the accommodating portion such that the display portion is configured to pivot in a vertical direction, wherein the display portion is capable of being pivoted with respect to the accommodating portion such that a center of mass of the display portion that has been pivoted from the accommodating portion is vertically above a center of mass of the display portion accommodated in the accommodating portion; and
- an applied member provided in the display portion so as to come into surface contact with the operation unit,
- wherein the applied member configured to receive the frictional force from the operation unit,
- wherein the applied member is provided to the display portion so that an area in contact with the operation unit, in a case where a center of mass of the display portion is positioned vertically above a predetermined position, is larger than the area in contact with the operation unit, in a case where the center of mass of the display portion is positioned at or below the predetermined position in a vertical direction,
- wherein the predetermined position is a position that the position of the center of mass of the display portion is vertically above the position of the center of mass of the display portion in a case where the display portion is accommodated in the accommodating portion,
- wherein the display portion in which the center of mass is positioned vertically above the predetermined position is stopped by the frictional force applied from the accommodating portion to the applied member, and the display portion in which the center of mass is positioned at or below the predetermined position is pivoted by a weight of the display portion and is accommodated in the accommodating portion.

39. The image forming apparatus according to claim 38, wherein the display surface of the display portion is parallel to the upper surface of the image forming apparatus in a state where the display portion is accommodated in the accommodating portion.

* * * * *